US008750630B2

(12) United States Patent
Baughman et al.

(10) Patent No.: US 8,750,630 B2
(45) Date of Patent: Jun. 10, 2014

(54) HIERARCHICAL AND INDEX BASED WATERMARKS REPRESENTED AS TREES

(75) Inventors: Aaron K. Baughman, Silver Spring, MD (US); Richard L. Darden, Leesburg, VA (US); James J. Fan, Mountain Lakes, NJ (US); Aditya A. Kalyanpur, Fort Lee, NJ (US)

(73) Assignee: International Business Machines Corporation, Armonk, NY (US)

( * ) Notice: Subject to any disclaimer, the term of this patent is extended or adjusted under 35 U.S.C. 154(b) by 144 days.

(21) Appl. No.: 13/549,056

(22) Filed: Jul. 13, 2012

(65) Prior Publication Data

US 2014/0016814 A1    Jan. 16, 2014

(51) Int. Cl.
*G06K 9/00* (2006.01)
*G06K 9/70* (2006.01)
*H04L 9/32* (2006.01)
*G06F 17/20* (2006.01)
*G06F 17/27* (2006.01)

(52) U.S. Cl.
USPC ........... 382/226; 382/100; 382/227; 713/176; 704/1; 704/9

(58) Field of Classification Search
USPC ............ 382/100, 226, 227; 713/176; 704/1, 9
See application file for complete search history.

(56) References Cited

U.S. PATENT DOCUMENTS

| 6,664,976 B2 | 12/2003 | Lofgren et al. |
| 2003/0128860 A1 | 7/2003 | Braudaway et al. |
| 2005/0031157 A1 | 2/2005 | Braudaway et al. |
| 2005/0198505 A1 | 9/2005 | Smith |
| 2007/0244693 A1 * | 10/2007 | Atallah et al. .................... 704/9 |
| 2008/0301456 A1 | 12/2008 | Staring et al. |
| 2010/0064305 A1 | 3/2010 | Schumann et al. |
| 2010/0104129 A1 | 4/2010 | He et al. |
| 2011/0033042 A1 | 2/2011 | Grossman |
| 2011/0228972 A1 | 9/2011 | Nakamura et al. |

OTHER PUBLICATIONS

Topkara et al., "Natural Language Watermarking," Jan. 2005, 12 pages, Proceedings of the SPIE International Conference on Security, Steganography, and Watermarking of Multimedia Contents.
Atallah et al., "Natural Language Watermarking and Tamperproofing," Oct. 2002, 15 pages, Fifth Information Hiding Workshop, IHW 2002, LNCS 2578, Springer Verlag.
Topkara et al., "Words Are Not Enough: Sentence Level Natural Language Watermarking," Oct. 2007, 10 pages, Proceedings of ACM Workshop on Content Protection and Security.

(Continued)

*Primary Examiner* — Amir Alavi
*Assistant Examiner* — Kenny Cese
(74) *Attorney, Agent, or Firm* — Douglas A. Lashmit; Hoffman Warnick LLC (57) ABSTRACT

An approach that provides hierarchical and index based watermarks represented as trees is described. In one embodiment, a watermark tree is formed from feature watermarks generated from a natural language processing (NLP) stack having NLP analytics. The watermark tree represents a hierarchical relationship between each of the feature watermarks. In particular, the watermark tree defines hierarchical pointers that point out inherited watermarks that exist between the feature watermarks according to the hierarchical relationship. Further, the watermark tree includes a time stamp specifying a time that a data set content residing in a corpus was accessed.

25 Claims, 4 Drawing Sheets

(56) References Cited

OTHER PUBLICATIONS

Topkara et al., "Natural Language Watermarking: Challenges in Building a Practical System," Jan. 2006, 12 pages, Proceedings of the SPIE International Conference on Security, Steganography, and Watermarking of Multimedia Contents.

Topkara et al., "The Hiding Virtues of Ambiguity: Quantifiably Resilient Watermarking of Natural Language Text Through Synonym Substitutions," Sep. 2006, 11 pages, Proceedings of ACM Multimedia and Security Workshop.

Topkara et al., "Information Hiding Through Errors: A Confusing Approach," Jan. 2007, 12 pages, Proceedings of the SPIE International Conference on Security, Steganography, and Watermarking of Multimedia Contents.

Topkara, "Hiding the Message Behind the Word: Advances in Natural Language Watermarking," Apr. 2007, 31 pages, CERIAS Seminar Materials, Purdue University.

Fan et al., "PRISMATIC: Inducing Knowledge from a Large Scale Lexicalized Relation Resource," Jun. 2010, pp. 122-127, Proceedings of the NAACL HLT 2010 First International Workshop on Formalisms and Methodology for Learning by Reading.

\* cited by examiner

HIERARCHICAL AND INDEX BASED WATERMARKS REPRESENTED AS TREES

TECHNICAL FIELD

This invention relates generally to watermarking content, and more specifically, to providing hierarchical and index based watermarks represented as trees that can protect content from modifications, while authenticating a source of the content to a particular corpus state.

BACKGROUND

Traditional watermark technologies typically provide security mechanisms to prevent counterfeit items. The watermarks, which can be both visible and invisible, are typically placed on source documents and can function to provide authorship and rights protection, veracity, and a tamperproof mechanism. One area in which watermarks have been used is with digital content that is accessible through the Internet. In particular, watermarks have been used to control how digital content (e.g., digital libraries, on-line newspapers, magazines, scientific journals, encyclopedias, personal blogs, stores, advertisements, etc.) is distributed or re-used. Natural language (NL) watermarking is one type of watermark technology that has been used to control how digital content is distributed or re-used. NL watermarking generally seeks to embed information in a text document by manipulating the semantic and/or syntactic structure of sentences. NL watermarking is different from text watermarking, which typically modifies the appearance of text formats or fonts such as for example, modifying inter-word and inter-letter spacing in text.

SUMMARY

In one embodiment, there is a method, performed on a computer system, for watermarking content stored in a plurality of corpora each having a plurality of corpuses. In this embodiment, the method comprises using the computer system to perform the following: receiving a data set of content from a corpus within one of the plurality of corpora; applying the data set to a natural language processing (NLP) stack including a plurality of NLP analytics each analyzing the data set; generating a feature watermark from each of the plurality of NLP analytics; and forming a watermark tree from each of the feature watermarks, the watermark tree representing a hierarchical relationship between each of the feature watermarks generated from each of the plurality of NLP analytics, the watermark tree defining hierarchical pointers that point out inherited watermarks that exist between the feature watermarks according to the hierarchical relationship, the watermark tree including a time stamp specifying a time that the data set was accessed from the corpus.

In a second embodiment, there is a computer system for watermarking content stored in a plurality of corpora each having a plurality of corpuses. In this embodiment, the computer system comprises at least one processing unit and memory operably associated with the at least one processing unit. A feature watermark tool is storable in memory and executable by the at least one processing unit. The feature watermark tool comprises an input component configured to receive a data set of content from a corpus within one of the plurality of corpora. The feature watermark tool also includes a natural language processing (NLP) stack including a plurality of NLP analytics each configured to extract features from the data set. In addition, the feature watermark tool includes a feature watermark generator configured to generate a feature watermark for each of the plurality of NLP analytics, for features extracted therefrom. The feature watermark generator is further configured to form a watermark tree from each of the feature watermarks. The watermark tree represents a hierarchical relationship between each of the feature watermarks generated from each of the plurality of NLP analytics. The watermark tree defines hierarchical pointers that point out inherited watermarks that exist between the feature watermarks according to the hierarchical relationship. The watermark tree includes a time stamp specifying a time that the data set was accessed.

In a third embodiment, there is a computer usable memory storing computer instructions, which when executed, enables a computer system to watermark content stored in a plurality of corpora each having a plurality of corpuses. The executed computer instructions causes the computer system to perform a method comprising: receiving a data set of content from a corpus within one of the plurality of corpora; applying the data set to a natural language processing (NLP) stack including a plurality of NLP analytics each analyzing the data set; generating a feature watermark from each of the plurality of NLP analytics; and forming a watermark tree from each of the feature watermarks, the watermark tree representing a hierarchical relationship between each of the feature watermarks generated from each of the plurality of NLP analytics, the watermark tree defining hierarchical pointers that point out inherited watermarks that exist between the feature watermarks according to the hierarchical relationship, the watermark tree including a time stamp specifying a time that the data set was accessed from the corpus.

DETAILED DESCRIPTION

Embodiments of the present invention are directed to a technique for extending natural language processing (NLP) watermarking to include temporal marking and inheritance-based marking to protect content in a corpus that is part of a corpora from modifications (e.g., deletes or updates), while authenticating the source of the content to a particular corpus state. In one embodiment, visible watermarks can be produced within a corpus and used as temporal markers and hierarchical pointers in a watermark tree. To ensure the veracity of the corpus at a particular time, the watermark pointers in the watermark tree can be recursively transversed to measure parent authenticity. If along a chain any parent fails validation, then a sub-chain from the invalid watermark to the child is marked invalid. In addition, the entire sub-tree of watermarks from the invalid marker is deemed invalid. Thus, when a part of the corpus at a given time is deemed invalid, then results from any delta searches on the corpus at a particular time will not be valid, and can be filtered from results. In one embodiment, during active corpus visualization, a user can be notified when a part of the corpus is corrupt, so that when additional data sources are selected, the user does not take into account dirty data.

Tracking corpus changes in this manner is desirable so that as new data sources are added to a system, the relative relevance of a source can be determined. In addition, the tracking of corpus changes makes it suitable for use in a time-based question answering system that uses corpus states at varying times to provide exploratory benefits such as authenticated provenance and automated source weight selection.

Benefits associated with the NLP watermarking embodiments described herein include the use of tree-based watermarks to invalidate portions of a corpus or features during the detection of an invalid watermark. In addition, the tree-based watermarks enables parent attribution, i.e., a watermark in a tree will know the parents or related entities. There will also be temporal resolution, i.e., the watermarks will have temporal context dependent on the watermark tree. This temporal resolution can be further extended beyond the watermark tree to a corpus and corpora level. Another benefit is that the NLP watermarking embodiments of the present invention can provide visible obfuscated watermarks which provide a clear meaning of definition as opposed to obfuscated codes. Other benefits are that the various embodiments of the present invention support delta loads and delta searches.

Figure 1:
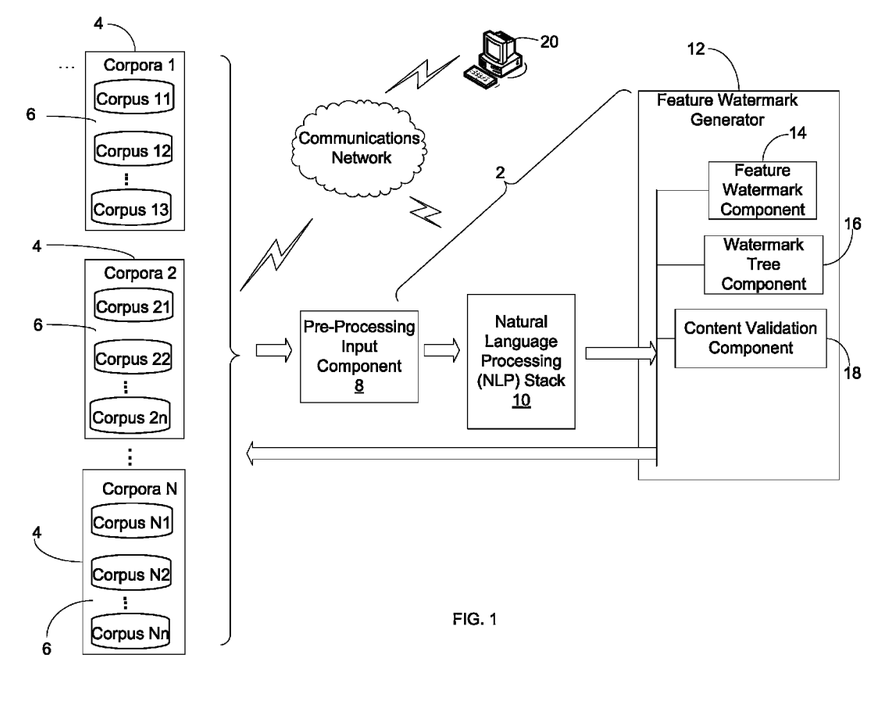
FIG. 1 shows a schematic diagram of a feature watermark tool that can watermark content stored in a plurality of corpora each having a plurality of corpuses according to one embodiment of this invention.

Referring to the figures, FIG. 1 shows a schematic diagram of a feature watermark tool 2 that can watermark content stored in a plurality of corpora 4 each having a plurality of corpuses 6 according to one embodiment of this invention. The corporas 4 and corpuses 6 can be any database that stores large amounts of data sets of content in machine-readable form. Digital libraries, on-line newspapers, magazines, scientific journals, encyclopedias, personal blogs, stores, advertisement collections, are examples of content that can be stored in the corporas 4 and corpuses 6.

As shown in FIG. 1, the feature watermark tool 2 includes a pre-processing input component 8 configured to receive a data set of content from a corpus 6 within one of the plurality of corpora 4. In addition, the pre-processing input component 8 can perform pre-processing functions that include annotating the content with extra information. For example, part-of-speech tagging can be performed on each word's part of speech (e.g., verb, noun, adjective). Linguistic transformation is another pre-processing function that can be performed by the pre-processing input component 8. Linguistic transformation can include synonym substitutions, syntactic transformations and semantic transformations. NLP parsing is yet another function that can be performed by the pre-processing input component 8. The NLP parsing can include processing input sentences and producing some sort of structure for the content which is received in a raw form. The output of the NLP parsing may either be the morphological, syntactical or semantical structure of sentences or it may be a combination of these. The output of the pre-processing input component 8 is a chunk of text that is representative of the content in a raw form that is obtained from a corpus 6 within a particular corpora 4.

An NLP stack 10 receives the chunk of text from the pre-processing input component 8 and is configured to extract features from the data set. The NLP stack 10 can include a plurality of NLP analytics that are each configured to analyze the data set embodied in the chunk of text and extract features therefrom. In one embodiment, as illustrated below with respect to FIG. 2, the NLP stack 10 can take the form of a precedence pipeline that analyzes the content received from the pre-processing input component 8 according to a predetermined hierarchical order. Examples of NLP analytics that can be performed on the content can include English slot grammar analytics, predicate argument structure analytics, named entity detection analytics, temporal resolution analytics, co-reference analytics, N-force feature extraction analytics, temporal arithmetic analytics, anaphora resolution analytics, word substitutions analytics, and statistical semantic relations analytics. These analytics are only examples of some NLP analytics that can be used to extract features from the content and are not meant to limit the scope of the feature watermark tool 2.

No matter what NLP analytics are used, they can be arranged in a predetermined hierarchical order so that some analytics are performed prior to others. Furthermore, some of the analytics may be dependent on others. That is, the determination of one analytic may be required as input for another analytic, and thus needs to be performed first. Those skilled in the art will appreciate that the hierarchical order of the NLP stack 10 is not permanent and can be changed depending on user specifications. If the hierarchical order does change, then the order that the feature watermarks are ascertained will also change.

A feature watermark generator 12 receives the features extracted from each of the NLP analytics and generates a feature watermark specific for each of the analytics. In one embodiment, the feature watermarks for the NLP analytics are determined in an order that conforms to the hierarchical relationship established in the NLP stack 10. For example, consider an NLP stack 10 with English slot grammar analytics, type of speech analytics, named entity detection analytics, temporal resolution analytics and co-reference analytics in descending order. In this example, the feature watermark generator 12 would determine a feature watermark for the features extracted from the English slot grammar analytics first. The feature watermark generator 12 would then use the feature watermark generated for English slot grammar as input for the type of speech feature watermark determination. In some instances, it is possible due to the hierarchical relationship of the NLP analytics, that some analytics lower in the hierarchy may have as input other analytics that are not immediately above it. For instance, the co-reference analytic, which is at the bottom of the hierarchical relationship of this example, may be a child of the named entity detection analytic. In the scenario where the named entity detection analytic is a parent of the co-reference analytic, then the feature watermark generator 12 would use the feature watermark generated for the name entity detection analytic as input in the determination of a feature watermark for the co-reference analytic.

As shown in FIG. 1, feature watermark generator 12 includes a feature watermark component 14 to determine the feature watermarks specific for each of the NLP analytics. In one embodiment, feature watermark component 14 determines the feature watermarks according to the following relationship:

$$F(\overline{C}_t, T, \overline{S}_t) = W_t^x, \text{ wherein} \tag{1}$$

$\overline{C}_t$ is a content vector at time t,

T is a time stamp at time t, $\overline{S}_t$ is a supertype vector at time stamp T, $W_t^x$ is a watermark of feature or attribute x at time stamp T, and F(*) is the visible watermark or hashing parameterized function.

Generally, a feature watermark $W_t^x$ for an extracted feature x at time stamp T is a function of a content vector ($\overline{C}_t$) at time t calculated for content in a particular data set, a time stamp (T) at time t, and a supertype vector ($\overline{S}_t$) at time stamp T, which is the feature watermark of a parent of the feature watermark currently being determined.

A watermark tree component 16 forms a watermark tree from each of the feature watermarks determined by the feature watermark component 14. In one embodiment, the watermark tree component 16 forms a watermark tree that represents the hierarchical relationship between each of the feature watermarks generated from the feature watermark component 14 per the relationship of the NLP analytics. The watermark tree formed by the watermark tree component 16 generally defines an index of hierarchical pointers that point out the inherited watermarks that exist between the feature watermarks according to the hierarchical relationship between each of the feature watermarks. As used herein, an inherited watermark is a compact representation of parent attributes. The watermark tree can also include a time stamp specifying the time that the data set represented by the tree was accessed from the corpus.

The watermark tree component 16 will typically form a watermark tree every time any modifications are made to the content with a particular corpus 6. As a result, there will be a large amount of watermark trees generated by the watermark tree component 16 that can range from thousands to millions. Each of the watermark trees will be time stamped at the time of formation to reflect the time that the changes were made to the content in a particular corpus 6 that is part of a particular corpora 4. Thus, the watermark trees can be formed to show the time stamps for the content, corpus and corpora.

Generally, each of the watermark trees represents a hierarchy of watermark features at a given dimensional vector. In one embodiment, the time vector provides the initial lookup or index for a particular tree. Each watermark tree is a composition of components that are inherited for watermark construction. The base case is essentially a single watermark tree at a given index. Through induction, any n+1 watermark trees can be formed at various time stamps for a particular corpus. In one embodiment, each index is defined by a feature vector that can contain time and space. The feature watermark F(*) set forth above in relationship (1) parameterizes time and can use a multi dimensional vector if desired. In that case, instead of a time stamp, a vector stamp would be used therefor. In any case, the generation of multiple watermark trees in this manner enables the various embodiments of the present invention to "fingerprint" the source of any modifications made to the content within a given corpora 4 and corpus 6.

All of these watermark trees formed by the watermark tree component 16 can be stored back in the corporas 4 and corpuses 6 and accessed by a user via a computing device 20. The user can use the watermark trees in such functions that include assessing and analyzing use, control and distribution of content in the corporas 4 and corpuses 6. Those skilled in the art will appreciate that the watermark trees are not limited to being stored back in the corporas 4 and corpuses 6. For example, the watermark trees can be stored in another database or repository and accessed by the user via the computing device 20 through another communication network.

Referring back to FIG. 1, the feature watermark generator 12 further includes a content validation component 18 that is configured to use the time stamped watermark trees to validate the content of the corpus in case it is desired to ascertain how data content in a particular corpus 6 of a corpora 4 is performing. Content validation can be used in a multiple of scenarios. For example, in a time-based question answering system, the various embodiments of the present invention can be used to validate the content of data used in such a system. Consider a scenario where a medical doctor wants to add new data sources to a medically-related question and answering system that is run over a corpus watermarked in the manner described above. In such a scenario, the content validation component 18 can be used to ensure content validation of the content in new data sources with the corpus. All valid data from the corpus at all time stamps will pass a filter and be available for use in the medically-related question and answering system. Invalid data will not pass the filter and thus not be available for use. This is just one example and those skilled in the art will appreciate that there are many other scenarios that the content validation component 18 can be used to detect changes made to content. Generally, the content validation component 18 can be used any scenario where it is desirable to ensure the validity of data in a copora 4 (e.g., in response to a corpus being updated with a new source of data).

In one embodiment, the validation of data content by the content validation component 18 can include authenticating a particular corpus and corpora storing the content at a certain time as a function of the watermark trees formed by the watermark tree component 16. The authentication can include selecting a watermark tree from the stored watermark trees that has a time stamp that corresponds with the particular time designated in the authenticating of the corpus and corpora. Next, the hierarchical pointers in the watermark tree are recursively transversed to measure whether a feature watermark associated with each parent in the hierarchical relationship embodied therein can be validated as having a valid feature watermark. As used herein, a valid feature watermark follows the feature set construct of the current tree ply level and a parent watermark, if applicable.

A parent in the hierarchical relationship that fails to have a valid feature watermark is invalidated. As used herein, an invalid feature watermark does not follow the feature set construct for a particular data set at a point in time within the context of an operating system. In addition to invalidating a parent that fails to have a valid feature watermark, all children in the hierarchical relationship that depend from the invalidated parent are also invalidated. Furthermore, all feature watermarks in a sub-chain of the hierarchical relationship that emanate from the invalidated parent are also invalidated. In one embodiment, all content associated with the invalidated feature watermarks can be filtered from any search results generated from the corpus in response to a search request made thereon.

In cases where certain parents and children in the hierarchical relationship have been deemed to have invalid feature watermarks, then the feature watermark component 14 and watermark tree component 16 can be used in the re-preprocessing of all data content associated with these nodes in the relationship. In one embodiment, the feature watermark component 14 and watermark tree component 16 will generate a new feature watermark for only parents and children in the hierarchical relationship that have invalidated feature watermarks, while parents and children in the hierarchical relationship having validated features will retain their current watermark features. This ensures an optimized replication process in that only watermark features that have changed are re-preprocessed, while watermark features that have not changes are not re-preprocessed. In one embodiment, the re-preprocessing performed by the feature watermark component 14 and watermark tree component 16 can occur after any operations performed by the pre-processing input component 8 and the NLP stack 10.

The updated watermark tree that includes both the new feature watermarks and any unchanged watermarks can then be stored in the corpora 4 and corpuses 6 for future use. Like the other watermark trees, the updated watermark tree includes updated hierarchical pointers that point out inherited watermarks that exist between the new feature watermarks and the unchanged watermarks according to the hierarchical relationship. In addition, the updated watermark tree can include a new time stamp specifying a time that the updated watermark tree was formed.

Figure 2:
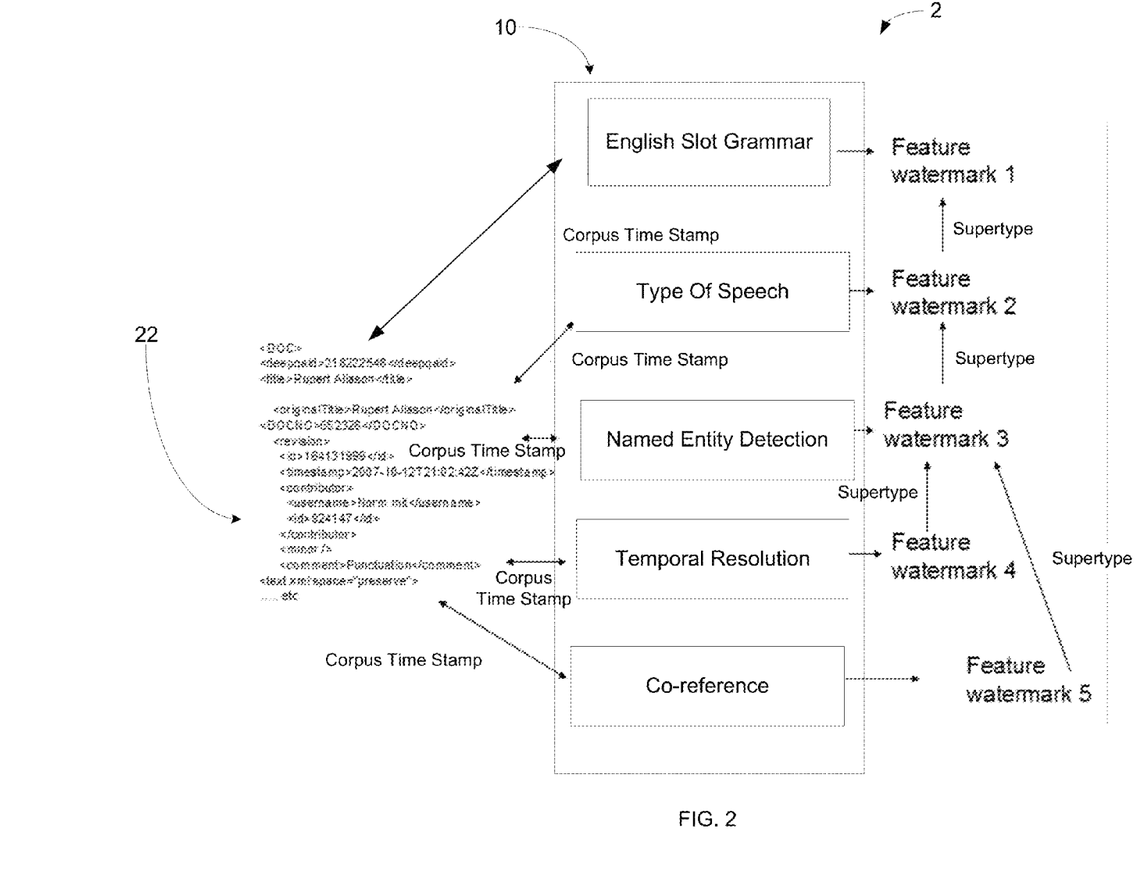
FIG. 2 shows a more detailed schematic view of the feature watermark tool depicted in FIG. 1 generating feature watermarks and a watermark tree from content run through a natural language processing (NLP) stack according to one embodiment of this invention.

FIG. 2 shows a more detailed schematic view of the feature watermark tool 2 depicted in FIG. 1 generating feature watermarks and a watermark tree from content run through the NLP stack 10 according to one embodiment of this invention. Note that for clarity, FIG. 2 does not show the feature watermark generator 12. However, as described above, the feature watermark generator 12 depicted in FIG. 1 would be used to generate the feature watermarks and watermark trees from the features extracted from the NLP stack 10.

As shown in FIG. 2, a chunk of data content 22 is obtained from a corpus 6 in a corpora 4 (FIG. 1) and structured by the pre-processing input component 8 (FIG. 1). The chunk of data content 22 is inputted into the NLP stack 10 and is designated with a corpus time stamp to reflect a time that it was entered into that particular corpus. Although not shown in FIG. 2, the chunk of data content could also contain a corpora time stamp to reflect a time that it was entered into that particular copora.

In the example of FIG. 2, the NLP stack 10 includes English slot grammar, type of speech analytics, named entity detection analytics, temporal resolution analytics and co-reference analytics. The hierarchical order of the pipeline of the NLP analytics starts with English slot grammar and descends in order to the type of speech analytics, named entity detection analytics, temporal resolution analytics and co-reference analytics. Each of these NLP analytics extract features which are used by the feature watermark generator 12 (FIG. 1) to generate feature watermarks for each of the analytics.

After determining feature watermarks, the feature watermark generator 12 can then form a watermark tree 24 that is in accordance with the hierarchical order specified in the NLP stack 10. As shown in FIG. 2, a feature watermark 1 is generated for the English slot grammar analytic, a feature watermark 2 is generated for the type of speech analytic, a feature watermark 3 is generated for the named entity detection analytic, a feature watermark 4 is generated for the temporal resolution analytic, and a feature watermark 5 is generated for the co-reference analytic.

FIG. 2 further shows the parent-children relations of the watermark tree 24 including all sub-chains in the tree. In FIG. 2, a parent is designated with the Supertype variable. For example, feature watermark 1 is the parent of feature watermark 2, which is the parent of feature watermark 3. As shown in the example of FIG. 2, feature watermark 3 is the parent of feature watermark 4 and feature watermark 5. The hierarchical pointers specified in the watermark tree 24 indicate all of the inherited watermarks that arise from the hierarchical relationship established by the NLP stack 10. The hierarchical pointers are used as an index to establish watermark features for all nodes in the tree. For example, FIG. 2 illustrates that feature watermark 1 is used as input for determining feature watermark 2. Similarly, feature watermark 3 is used as input for determining feature watermark 4 and 5. Note that in these examples and others that are similarly related, the inputs of the parents (i.e., the content vector and supertype vectors) should have the same time stamp as the child in which the feature watermark was determined.

Figure 3:
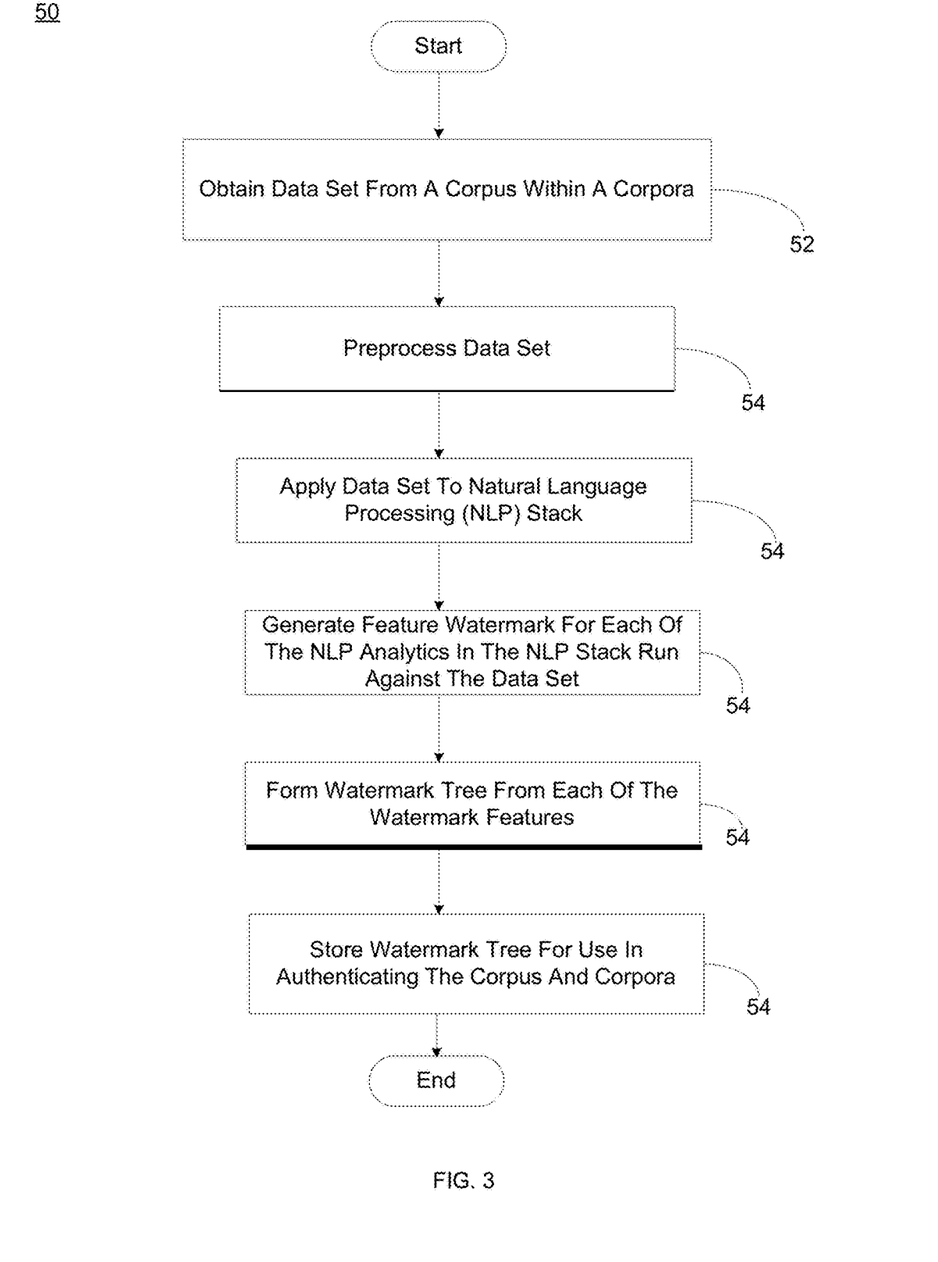
FIG. 3 shows a flow chart describing the general operations performed by the feature watermark tool shown in FIG. 1.

FIG. 3 shows a flow chart 26 describing the general operations performed by the feature watermark tool 2 shown in FIG. 1. In FIG. 3, flow chart 26 begins at 28 receiving a data set of content from a corpus within a corpora. The content in its raw form is then preprocessed at 30 to generate a structured chunk of text that is suitable for NLP. The structured chunk of text is applied to the NLP stack at 32 for analyzing of the data that can include feature extraction. The feature watermark generator 12 generates a feature watermark for each of the NLP analytics at 34. In one embodiment, each feature watermark is determined in accordance with relationship 1 specified above. The watermark tree component 16 forms a watermark tree from each of the feature watermarks at 36 in the manner described above. The watermark tree can represent a hierarchical relationship between each of the feature watermarks generated from each of the plurality of NLP analytics. In particular, the watermark tree can define hierarchical pointers that point out inherited watermarks that exist between the feature watermarks per its hierarchical relationship. The formed watermark tree can then be stored at 38 and used for content validation (i.e., authenticating a corpus and corpora from which the content was obtained) or the like.

The foregoing flow chart shows some of the processing functions associated with generating feature watermarks and forming watermark trees. In this regard, each block represents a process act associated with performing these functions. It should also be noted that in some alternative implementations, the acts noted in the blocks may occur out of the order noted in the figure or, for example, may in fact be executed substantially concurrently or in the reverse order, depending upon the act involved. Also, one of ordinary skill in the art will recognize that additional blocks that describe the processing functions may be added.

Figure 4:
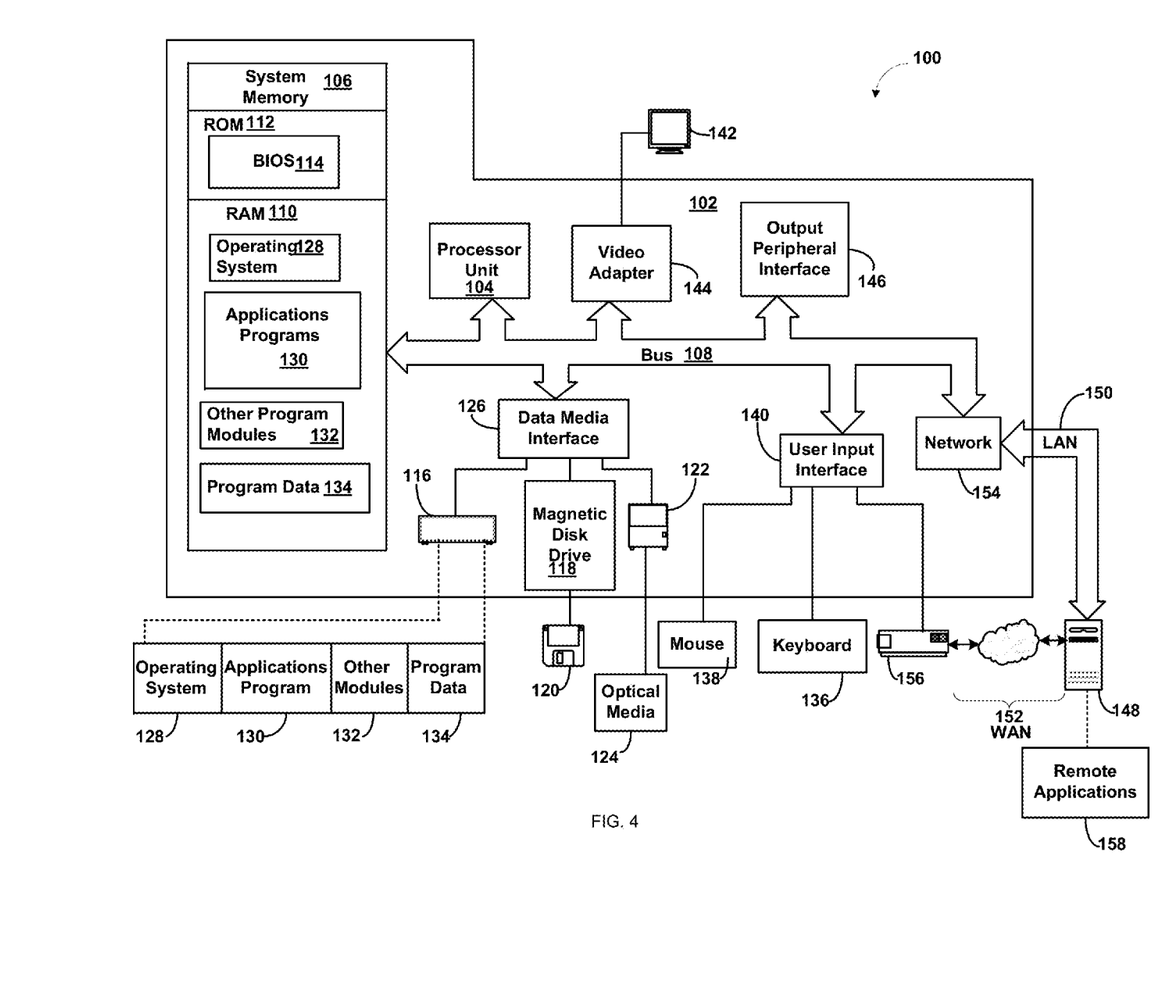
FIG. 4 shows a schematic of a computing environment in which elements of the feature watermark tool shown in FIG. 1 may operate.

FIG. 4 shows a schematic of a computing environment in which elements of the feature watermark tool shown in FIG. 1 may operate. The exemplary computing environment 100 is only one example of a suitable computing environment and is not intended to suggest any limitation as to the scope of use or functionality of the approach described herein. Neither should the computing environment 100 be interpreted as having any dependency or requirement relating to any one or combination of components illustrated in FIG. 4.

In the computing environment 100 there is a computer 102 which is operational with numerous other general purpose or special purpose computing system environments or configurations. Examples of well known computing systems, environments, and/or configurations that may be suitable for use with an exemplary computer 102 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary computer 102 may be described in the general context of computer-executable instructions, such as program modules, being executed by a computer. Generally, program modules include routines, programs, objects, components, logic, data structures, and so on, that performs particular tasks or implements particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

As shown in FIG. 4, the computer 102 in the computing environment 100 is shown in the form of a general-purpose computing device. The components of computer 102 may include, but are not limited to, one or more processors or processing units 104, a system memory 106, and a bus 108 that couples various system components including the system memory 106 to the processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 102 typically includes a variety of computer readable media. Such media may be any available media that is accessible by computer 102, and it includes both volatile and non-volatile media, removable and non-removable media.

In FIG. 4, the system memory 106 includes computer readable media in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112. RAM 110 typically contains data and/or program modules that are immediately accessible to and/or presently operated on by processor 104.

Computer 102 may further include other removable/non-removable, volatile/non-volatile computer storage media. By way of example only, FIG. 4 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. The hard disk drive 116, magnetic disk drive 118, and optical disk drive 122 are each connected to bus 108 by one or more data media interfaces 126.

The drives and their associated computer-readable media provide nonvolatile storage of computer readable instructions, data structures, program modules, and other data for computer 102. Although the exemplary environment described herein employs a hard disk 116, a removable magnetic disk 118 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on the hard disk 116, magnetic disk 120, optical disk 122, ROM 112, or RAM 110, including, by way of example, and not limitation, an operating system 128, one or more application programs 130 (e.g., the feature watermark tool 2), other program modules 132, and program data 134. Each of the operating system 128, one or more application programs 130 other program modules 132, and program data 134 or some combination thereof, may include an implementation of the feature watermark tool 2 shown in FIG. 1.

A user may enter commands and information into computer 102 through optional input devices such as a keyboard 136 and a pointing device 138 (such as a "mouse"). Other input devices (not shown) may include a microphone, joystick, game pad, satellite dish, serial port, scanner, camera, or the like. These and other input devices are connected to the processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 4 are a local area network (LAN) 150 and a general wide area network (WAN) 152. Such networking environments are commonplace in offices, enterprise-wide computer networks, intranets, and the Internet. When used in a LAN networking environment, the computer 102 is connected to LAN 150 via network interface or adapter 154. When used in a WAN networking environment, the computer typically includes a modem 156 or other means for establishing communications over the WAN 152. The modem, which may be internal or external, may be connected to the system bus 108 via the user input interface 140 or other appropriate mechanism.

In a networked environment, program modules depicted relative to the personal computer 102, or portions thereof, may be stored in a remote memory storage device. By way of example, and not limitation, FIG. 4 illustrates remote application programs 158 as residing on a memory device of remote computer 148. It will be appreciated that the network connections shown and described are exemplary other means of establishing a communications link between the computers may be used.

An implementation of an exemplary computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for providing a feature watermark tool. While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method, performed on a computer system, for watermarking content stored in a plurality of corpora each having a plurality of corpuses, the method comprising:
   using the computer system to perform the following:
      receiving a data set of content from a corpus within one of the plurality of corpora;
      applying the data set to a natural language processing (NLP) stack including a plurality of NLP analytics each analyzing the data set;
      generating a feature watermark from each of the plurality of NLP analytics; and
      forming a watermark tree from each of the feature watermarks, the watermark tree representing a hierarchical relationship between each of the feature watermarks generated from each of the plurality of NLP analytics, the watermark tree defining hierarchical pointers that point out inherited watermarks that exist between the feature watermarks according to the hierarchical relationship, the watermark tree including a time stamp specifying a time that the data set was accessed from the corpus.

2. The method according to claim 1, further comprising storing the watermark tree in the corpus with a corpus time stamp and applying a corpora time stamp to the corpora associated with the corpus in response to storing the watermark in the corpus, the corpus including a plurality of watermark trees each formed at a different time stamp, and the corpora including a plurality of corpora time stamps each associated with storing one of the plurality of watermark trees in the corpus.

3. The method according to claim 2, further comprising using the time stamped plurality of watermark trees to validate content of the corpus in response to being updated with a new source of data.

4. The method according to claim 3, further comprising authenticating the corpus and corpora at a particular time as a function of the plurality of watermark trees.

5. The method according to claim 4, wherein the authenticating includes selecting a watermark tree from the plurality of watermark trees that has a time stamp that corresponds with the particular time designated in the authenticating of the corpus and corpora, recursively transversing the hierarchical pointers in the watermark tree to measure whether a feature watermark associated with each parent in the hierarchical relationship can be validated as having a valid feature watermark.

6. The method according to claim 5, further comprising invalidating a parent in the hierarchical relationship that fails to have a valid feature watermark, and invalidating all children in the hierarchical relationship that depend from the invalidated parent.

7. The method according to claim 6, further comprising invalidating all feature watermarks in a sub-chain of the hierarchical relationship that emanate from the invalidated parent.

8. The method according to claim 7, further comprising filtering all content associated with all invalidated feature watermarks from search results generated from the corpus in response to a search request made thereon.

9. The method according to claim 7, further comprising re-preprocessing all data content associated with parents and children in the hierarchical relationship that have invalidated feature watermarks.

10. The method according to claim 9, wherein the re-preprocessing comprises generating a new feature watermark for only parents and children in the hierarchical relationship that have invalidated feature watermarks, while parents and children in the hierarchical relationship having validated features retain current watermark features.

11. The method according to claim 10, further comprising forming an updated watermark tree for the hierarchical relationship that includes both the new feature watermarks and any unchanged watermarks, the updated watermark tree including updated hierarchical pointers that point out inherited watermarks that exist between the new feature watermarks and the unchanged watermarks according to the hierarchical relationship, the updated watermark tree including a new time stamp specifying a time that the updated watermark tree was formed.

12. The method according to claim 11, further comprising storing the updated watermark tree in the corpus with a new corpus time stamp and a new corpora time stamp.

13. The method according to claim 1, wherein each feature watermark is determined according to:

$$F(\overline{C}_t, T, \overline{S}_t) = W_t^x, \text{ wherein}$$

$\overline{C}_t$ is a content vector at time t,
T is a time stamp at time t,
$\overline{S}_t$ is a supertype vector at time stamp T,
$W_t^x$ is a watermark of feature or attribute x at time stamp T, and
F(*) is the visible watermark or hashing parameterized function.

14. A computer system for watermarking content stored in a plurality of corpora each having a plurality of corpuses, the computer system comprising:
   at least one processing unit;
   memory operably associated with the at least one processing unit; and
   a feature watermark tool storable in memory and executable by the at least one processing unit, the tool comprising:
      an input component configured to receive a data set of content from a corpus within one of the plurality of corpora;
      a natural language processing (NLP) stack including a plurality of NLP analytics each configured to extract features from the data set; and
      a feature watermark generator configured to generate a feature watermark for each of the plurality of NLP analytics for features extracted therefrom, the feature watermark generator further configured to form a watermark tree from each of the feature watermarks, the watermark tree representing a hierarchical relationship between each of the feature watermarks generated from each of the plurality of NLP analytics, the watermark tree defining hierarchical pointers that point out inherited watermarks that exist between the feature watermarks according to the hierarchical relationship, the watermark tree including a time stamp specifying a time that the data set was accessed from the corpus.

15. The computer system according to claim 14, wherein the feature watermark generator is further configured to store the watermark tree in the corpus with a corpus time stamp and apply a corpora time stamp to the corpora associated with the corpus in response to storing the watermark in the corpus, the corpus including a plurality of watermark trees each formed at a different time stamp, and the corpora including a plurality of corpora time stamps each associated with storing one of the plurality of watermark trees in the corpus.

16. The computer system of claim 14, wherein the feature watermark generator generates the feature watermarks from a plurality of hierarchical hashes each being a component of a feature watermark function defined as:

$$F(\overline{C}_t, T, \overline{S}_t) = W_t^x, \text{ wherein}$$

$\overline{C}_t$ is a content vector at time t,
T is a time stamp at time t,
$\overline{S}_t$ is a supertype vector at time stamp T,
$W_t^x$ is a watermark of feature or attribute x at time stamp T, and
F(*) is the visible watermark or hashing parameterized function.

17. The computer system of claim 14, wherein the feature watermark generator is further configured to use the time stamped plurality of watermark trees to validate content of the corpus in response to being updated with a new source of data.

18. A non-transitory computer readable medium storing computer instructions, which when executed, enables a computer system to watermark content stored in a plurality of corpora each having a plurality of corpuses, the executed computer instructions causing the computer system to perform a method comprising: receiving a data set of content from a corpus within one of the plurality of corpora; applying the data set to a natural language processing (NLP) stack including a plurality of NLP analytics each analyzing the data set; generating a feature watermark from each of the plurality of NLP analytics; and forming a watermark tree from each of the feature watermarks, the watermark tree representing a hierarchical relationship between each of the feature watermarks generated from each of the plurality of NLP analytics, the watermark tree defining hierarchical pointers that point out inherited watermarks that exist between the feature watermarks according to the hierarchical relationship, the watermark tree including a time stamp specifying a time that the data set was accessed.

19. The non-transitory computer readable medium according to claim 18, wherein the method performed by the computer system operating according to the executed computer instructions further comprises storing the watermark tree in the corpus with a corpus time stamp and applying a corpora time stamp to the corpora associated with the corpus in response to storing the watermark in the corpus, the corpus including a plurality of watermark trees each formed at a different time stamp, and the corpora including a plurality of corpora time stamps each associated with storing one of the plurality of watermark trees in the corpus.

20. The non-transitory computer readable medium according to claim 19, wherein the method performed by the computer system operating according to the executed computer instructions further comprises using the time stamped plurality of watermark trees to validate content of the corpus in response to being updated with a new source of data.

21. The non-transitory computer readable medium according to claim 19, wherein the method performed by the computer system operating according to the executed computer instructions further comprises authenticating the corpus and corpora at a particular time as a function of the plurality of watermark trees, wherein the authenticating includes selecting a watermark tree from the plurality of watermark trees that has a time stamp that corresponds with the particular time designated in the authenticating of the corpus and corpora, recursively transversing the hierarchical pointers in the watermark tree to measure whether a feature watermark associated with each parent in the hierarchical relationship can be validated as having a valid feature watermark.

22. The non-transitory computer readable medium according to claim 21, wherein the method performed by the computer system operating according to the executed computer instructions further comprises invalidating a parent in the hierarchical relationship that fails to have a valid feature watermark, and invalidating all children in the hierarchical relationship that depend from the invalidated parent.

23. The non-transitory computer readable medium according to claim 22, wherein the method performed by the computer system operating according to the executed computer instructions further comprises invalidating all feature watermarks in a sub-chain of the hierarchical relationship that emanate from the invalidated parent.

24. The non-transitory computer readable medium according to claim 23, wherein the method performed by the computer system operating according to the executed computer instructions further comprises re-preprocessing all data content associated with parents and children in the hierarchical relationship that have invalidated feature watermarks, the re-preprocessing including generating a new feature watermark for only parents and children in the hierarchical relationship that have invalidated feature watermarks, while parents and children in the hierarchical relationship having validated features retain current watermark features.

25. The non-transitory computer readable medium according to claim 24, wherein the method performed by the computer system operating according to the executed computer instructions further comprises forming an updated watermark tree for the hierarchical relationship that includes both the new feature watermarks and any unchanged watermarks, and storing the updated watermark tree in the corpus with a new corpus time stamp and a new corpora time stamp, the updated watermark tree including updated hierarchical pointers that point out inherited watermarks that exist between the new feature watermarks and the unchanged watermarks according to the hierarchical relationship, the updated watermark tree including a new time stamp specifying a time that the updated watermark tree was formed.

* * * * *